(12) United States Patent
Trebino

(10) Patent No.: US 6,504,612 B2
(45) Date of Patent: Jan. 7, 2003

(54) ELECTROMAGNETIC WAVE ANALYZER

(75) Inventor: Rick P. Trebino, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 64 days.

(21) Appl. No.: 09/850,772

(22) Filed: May 8, 2001

(65) Prior Publication Data

US 2002/0057435 A1 May 16, 2002

Related U.S. Application Data

(60) Provisional application No. 60/248,486, filed on Nov. 14, 2000.

(51) Int. Cl.$^7$ .................................................. G01J 4/00
(52) U.S. Cl. ........................................ 356/450; 356/484
(58) Field of Search .................................. 250/450, 484

(56) References Cited

U.S. PATENT DOCUMENTS

| | | | |
|---|---|---|---|
| 4,149,773 A | 4/1979 | Reid ........................... 350/163 |
| 4,792,230 A | 12/1988 | Naganuma et al. ......... 356/345 |
| 4,918,635 A | 4/1990 | Li et al. ...................... 364/713 |
| 4,972,423 A | 11/1990 | Alfano et al. .................. 372/25 |
| 4,973,160 A | 11/1990 | Takiguchi et al. .......... 356/345 |
| 4,994,663 A | 2/1991 | Aoshima et al. ............. 250/214 |
| 5,033,853 A | 7/1991 | Fragineas, Jr. ............... 356/346 |
| 5,233,182 A | 8/1993 | Szabo et al. ................. 250/214 |
| 5,299,170 A | 3/1994 | Shibata et al. .............. 356/345 |
| 5,390,042 A | 2/1995 | Ito et al. ...................... 359/189 |
| 5,461,234 A | 10/1995 | Miyazaki et al. ............ 250/372 |
| 5,489,984 A | 2/1996 | Hariharan et al. .......... 356/360 |
| 5,530,544 A | 6/1996 | Trebino et al. .............. 356/345 |
| 5,585,913 A | 12/1996 | Hariharan et al. ......... 356/4.09 |
| 5,648,866 A | 7/1997 | Trebino et al. .............. 359/326 |
| 5,710,658 A | 1/1998 | Jacobson et al. ............ 359/328 |
| 5,754,292 A | 5/1998 | Kane et al. ................... 356/345 |
| 5,784,186 A | 7/1998 | Wang et al. ................. 359/200 |
| 5,815,519 A | 9/1998 | Aoshima et al. ............... 372/25 |
| 5,852,620 A | 12/1998 | Wan ............................ 372/22 |
| 5,867,304 A | 2/1999 | Galvanauskas et al. ..... 359/333 |
| 5,880,838 A | 3/1999 | Marx et al. .................. 356/351 |
| 5,900,956 A | 5/1999 | Cotter ......................... 359/139 |
| 5,936,732 A | 8/1999 | Smirl et al. .................. 356/346 |
| 6,008,899 A | 12/1999 | Trebino et al. .............. 356/345 |
| 6,025,911 A | 2/2000 | Diddams et al. ............. 356/345 |
| 6,057,919 A | 5/2000 | Machida et al. ............. 356/345 |

OTHER PUBLICATIONS

Measuring Ultrashort Laser Pulses in the Time–Frequency Domain Using Frequency–Resolved Optical Gating, Trebino, et al., *Rev. Sci. Instrum.*, 68 (9), Sep. 1997, pp. 3277–3295.

*Primary Examiner*—Stephone Allen
(74) *Attorney, Agent, or Firm*—Thomas, Kayden, Horstemeyer & Risley

(57) ABSTRACT

An electromagnetic wave analyzer determines intensity and phase characteristics of an electromagnetic wave such as an ultrashort laser pulse. The analyzer passes the electromagnetic wave through a Fresnel biprism that produces a probe pulse and a gated pulse. The probe pulse and the gated pulse intersect and interact in a nonlinear optical medium, such as a second harmonic generating (SHG) crystal. The nonlinear optical medium then time gates and frequency filters the electromagnetic wave producing an input pulse gated signal. A lens maps delay in a horizontal direction and crystal output angle in a vertical direction. A camera detects the output of the lens and creates a spectrogram of the electromagnetic wave.

26 Claims, 4 Drawing Sheets

Side View

Top View

ELECTROMAGNETIC WAVE ANALYZER

CROSS-REFERENCE TO RELATED APPLICATION

This application claims priority and the benefit of the filing date of copending U.S. provisional application entitled, "HIGHLY SIMPLIFIED DEVICE FOR MEASURING ULTRASHORT LASER PULSES," having Ser. No. 60/248,486, filed Nov. 14, 2000, which is entirely incorporated herein by reference.

TECHNICAL FIELD

The present invention is generally related to the analysis of electromagnetic waves and more particularly, is related to a system and method for analyzing the intensity and phase of light pulses with durations shorter than one nanosecond.

BACKGROUND OF THE INVENTION

Analysis of electromagnetic waves, such as ultrashort laser pulses, is required for fundamental research and applications, such as laser development, semiconductor characterization, combustion diagnostics, and optical coherence tomography. In addition, many material characterization techniques depend upon precise analysis of ultrashort pulses. One of the most promising applications requiring analysis of such waves is communications using intensity-shaped pulses and/or phase-shaped pulses.

For decades autocorrelators were the primary tool used to measure electromagnetic waves such as ultrashort laser pulses. However, autocorrelators are complex instruments having a large number of components, and autocorrelators yield, at best, only vague measurements of the pulse. To measure a pulse with an autocorrelator, the pulse is split into two identical copies of the pulse. The two pulses are then spatially and temporally overlapped in a carefully aligned nonlinear optical medium such as a second-harmonic-generation (SHG) crystal. The relative delay between the pulses must be scanned while maintaining alignment. The alignment involves four sensitive degrees of freedom—two spatial, one temporal, and one crystal angle. The sensitivity of the alignment increases the potential for error in autocorrelators and other pulse analysis systems.

In addition, autocorrelators require a very thin SHG crystal due to bandwidth constraints. The required thin SHG crystals can be expensive, hard to align, difficult to obtain, and troublesome to handle. The alignment and handling requirements of the SHG crystal increase the complexity of the autocorrelator. Thus, the thin SHG crystal is also a potential source of error in pulse analysis systems.

The potential source of error related to thin SHG crystals arises from the need to avoid group velocity mismatch (GVM). GVM is the walking off in time of the pulse and the second harmonic of the pulse due to different group velocities of the wavelength of the pulse and the wavelength of the second harmonic of the pulse. GVM can also be described as a crystal having a finite phase-matching bandwidth that only allows a small range of wavelengths to achieve efficient frequency doubling. The thin SHG crystal must be thin enough that the two pulses overlap throughout the entire thin SHG crystal. As an example, analysis of 100 femtosecond pulses requires an SHG crystal with a thickness of approximately 100 microns. SHG crystals approximately 100 microns thick are difficult to obtain and the thickness is difficult to verify. In addition, SHG crystal efficiency scales as the square of the SHG crystal thickness. Therefore, even when the SHG crystal is sufficiently thin, poor signal strength can limit the sensitivity of the analysis.

Autocorrelators do not measure the full intensity and phase of a pulse. One way to measure the full intensity and phase of an ultrashort laser pulse is a method known as Frequency-Resolved Optical Gating (FROG). FROG is described in U.S. Pat. No. 5,754,292 to Kane and Trebino, and U.S. Pat. No. 5,530,544 to Trebino et al. The '292 and '544 Patents are entirely incorporated herein by reference. The FROG method adds a spectrometer to an autocorrelator. Unfortunately, the addition of the spectrometer further complicates the autocorrelator and increases alignment problems. However, alternatives to FROG are more complex than the FROG apparatus and method. Some of the alternatives require one or more interferometers, or a first interferometer within a second interferometer.

FIG. 1 is a schematic illustration of a prior art ultrashort full pulse measuring device 10 using the FROG methodology. In FIG. 1 an ultrashort light input pulse 12 is introduced to a beam splitter 14. The beam splitter 14 produces a probe pulse 13 and a gate pulse 15. The probe pulse 13 is directed by an optical alignment system 16 through lens 20 into a rapidly responding nonlinear optical medium such as a thin SHG crystal 22. The gate pulse 15 is provided with a variable delay "τ" by delay line 18. The probe pulse 13 and the gate pulse 15 are focused into the thin SHG crystal 22 through lens 20. Thus, beams having electric fields E(t) and E(t-τ) intersect in the thin SHG crystal 22.

The interaction of the two beams in the thin SHG crystal 22 can occur via many processes and geometries, and many are treated in the prior art including Laser-Induced Dynamic Gratings, by H. J. Eichler et al., Springer-Verlag, New York (1988), which is entirely incorporated herein by reference. Several such geometries are shown in the '544 Patent. In the geometry shown in FIG. 1, the thin SHG crystal 22 is phase-matched for noncollinear second harmonic generation. With the thin SHG crystal 22, neither the probe pulse 13 nor the gate pulse 15 alone achieves significant second harmonic generation in the direction of the signal pulse. However, the probe pulse 13 and the gate pulse 15 together do achieve efficient second order harmonic generation. The gate pulse 15 gates the probe pulse 13 (i.e., gates a temporal slice of the probe pulse 13). The roles of the probe pulse 13 and the gate pulse 15 may be reversed. It does not matter which pulse is considered as gating the other.

Still referring to FIG. 1, a signal pulse ($E_{sig}(t,\tau)$) 17 is directed to a wavelength-selection device, such as a spectrometer 24, to resolve the frequency components in the signal pulse 17. The signal pulse 17 includes selected temporal slices of the probe pulse 13. A camera 26 records the spectrum of the input pulse 12 as a function of the time delay of the probe pulse 13 to produce an intensity plot vs. frequency (or wavelength) and delay, i.e. the "trace" of the input pulse 12. The input pulse 12 may be a femtosecond pulse; a negatively chirped pulse (i.e., a pulse with decreasing frequency with time); an unchirped pulse (i.e., a constant frequency pulse); a positively chirped pulse (i.e., a pulse with increasing frequency with time); or any other pulse. The camera 26 records traces corresponding to the input pulse 12 to uniquely determine the intensity and phase characteristics of the input pulse 12. The trace is a plot of intensity vs. frequency and delay (i.e., a type of spectrogram of the pulse) that is familiar to those of ordinary skill in the art. The trace contains all of the information necessary to reconstruct the intensity and phase characteristics of the input pulse 12. Without the spectrometer 24, the ultrashort pulse measuring device 10 of FIG. 1 is an autocorrelator in which the signal field's energy is measured vs. delay.

The trace is recorded and provided to a processing unit 28 to carry out processing calculations such as those described in the '544 Patent. Such a processing unit 28 may be a digital computer operating in accordance with a stored program, a neural net which is trained to recognize the output of the spectrometer 24, or numerous other calculating devices known to those skilled in the art, some of which are shown in the '544 Patent.

The operation and features of the prior art analysis systems have been described in various articles including, "Measuring Ultrashort Laser Pulses in the Time-Frequency Domain Using Frequency-Resolved Optical Gating," *Rev. Sci. Instr.*, vol. 68, pp. 3277–3295, 1997 by R. Trebino, K. W. DeLong, D. N. Fittinghoff, J. N. Sweetser, M. A. Krumbügel, and D. J. Kane, which is entirely incorporated herein by reference. Prior art analysis systems are also described in U.S. Pat. No. 5,648,866, and U.S. Pat. No. 6,008,899, both to Trebino et al, which are entirely incorporated herein by reference. In addition, prior art analysis systems are described in U.S. Pat. No. 5,936,732 to Smirl et al, and U.S Pat. No. 5,754,292 to Kane et al, which are also entirely incorporated herein by reference.

Despite the advances noted in the field, potential sources of error remain related to the sensitivity of the alignment of the prior art analysis devices and the very thin SHG crystals. In addition, due to their complexity, these devices are expensive (approximately $10,000), are fairly large, and are not easy to use. Thus, a heretofore unaddressed need exists in the industry to address the aforementioned deficiencies and inadequacies.

SUMMARY OF THE INVENTION

An electromagnetic wave analyzer provides systems and methods for measuring and/or detecting the intensity and phase of light pulses. The electromagnetic wave analyzer eliminates the need for a spectrometer, a beam-splitter, a delay line, and the thin second-harmonic-generation (SHG) crystal. The electromagnetic wave analyzer uses an easily attainable thick SHG crystal and yields about one thousand times more signal than the prior art analysis devices. In addition, the electromagnetic wave analyzer does not require sensitive alignment parameters. The electromagnetic wave analyzer can measure a single pulse of an electromagnetic wave by using a few optical components. Yet, the electromagnetic wave analyzer yields traces as useful or better than those of the prior art.

Briefly described, in architecture, the electromagnetic wave analyzer can be implemented as follows. The electromagnetic wave may be an ultrafast laser pulse. A Fresnel biprism accepts the ultrafast laser input pulse and produces a probe pulse and a gate pulse. The Fresnel biprism then delays the gate pulse in relation to the probe pulse so that the relative delay varies with the transverse position of a non-linear optical medium, such as a second harmonic generation (SHG) crystal. The SHG crystal is configured to accept the probe pulse and the gate pulse. The SHG crystal has a group velocity mismatch (GVM) and a group velocity dispersion (GVD) in relation to the input pulse. A pulse time-bandwidth product (TBP) may be used to determine the GVM and the GVD. The SHG crystal is configured so that the pulse TBP is less than GVM/GVD. The GVM and GVD may be varied by varying the thickness of the SHG crystal and/or the crystal material. The SHG crystal phase-matches a limited range of frequencies. The phase-matching may be a frequency doubling of the limited range of frequencies. The SHG crystal produces an output based on the phase-matching of the limited range of frequencies. A camera then records a data trace representing intensity vs. delay in a first direction and frequency in a second direction. The second direction is generally near perpendicular to the first direction.

The electromagnetic wave analyzer can also be viewed as providing a method for detecting electromagnetic waves such as ultrashort laser pulses. In this regard, the method can be broadly summarized by the following steps: providing an input pulse; producing a probe pulse and a gated pulse; delaying the gate pulse in relation to the probe pulse; introducing the probe pulse and the gated pulse to a non-linear optical medium such as an SHG crystal, the SHG crystal having a GVM and a GVD in relation to the input pulse, the input pulse having a TBP where TBP is less than GVM/GVD, the SHG crystal being configured to phase-match a limited range of frequencies and to produce an output based on the phase-matching; and introducing the output of the SHG crystal to a camera that detects a trace that yields the intensity and phase of the input pulse.

Other systems, methods, features, and advantages of the electromagnetic wave analyzer will be or become apparent to one with skill in the art upon examination of the following drawings and detailed description. It is intended that all such additional systems, methods, features, and advantages be included within this description, be within the scope of the electromagnetic wave analyzer, and be protected by the accompanying claims.

BRIEF DESCRIPTION OF THE DRAWINGS

The electromagnetic wave analyzer can be better understood with reference to the following drawings. The components in the drawings are not necessarily to scale, emphasis instead being placed upon clearly illustrating the principles of the electromagnetic wave analyzer. Moreover, in the drawings, like reference numerals designate corresponding parts throughout the several views.

DETAILED DESCRIPTION

To address the shortcomings of the prior art, new electromagnetic wave analysis systems and methods are presented. The new systems and methods do not require a spectrometer, a thin second harmonic generating (SHG) crystal, a beam-splitter, or a delay line. The electromagnetic wave analysis system and method use a relatively thick SHG crystal as described below. The thick SHG crystal uses the finite phase-matching bandwidth of the thick SHG crystal as a frequency filter and also uses the thick SHG crystal to time-gate a probe pulse. The electromagnetic wave analyzer uses a "single-shot" beam geometry. The "single-shot" beam geometry allows for the analysis of a single pulse of light. Thus, the electromagnetic wave analyzer replaces complicated components with simpler, more compact, and less expensive components, including the use of a Fresnel biprism. The Fresnel biprism splits the probe pulse into a gate pulse and a probe pulse. The Fresnel biprism also delays the gate pulse in relation to the probe pulse.

Any electromagnetic wave may be detected and/or analyzed by the electromagnetic wave analyzer. In the embodiments described below, the electromagnetic wave is an ultrashort laser pulse.

Figure 2:
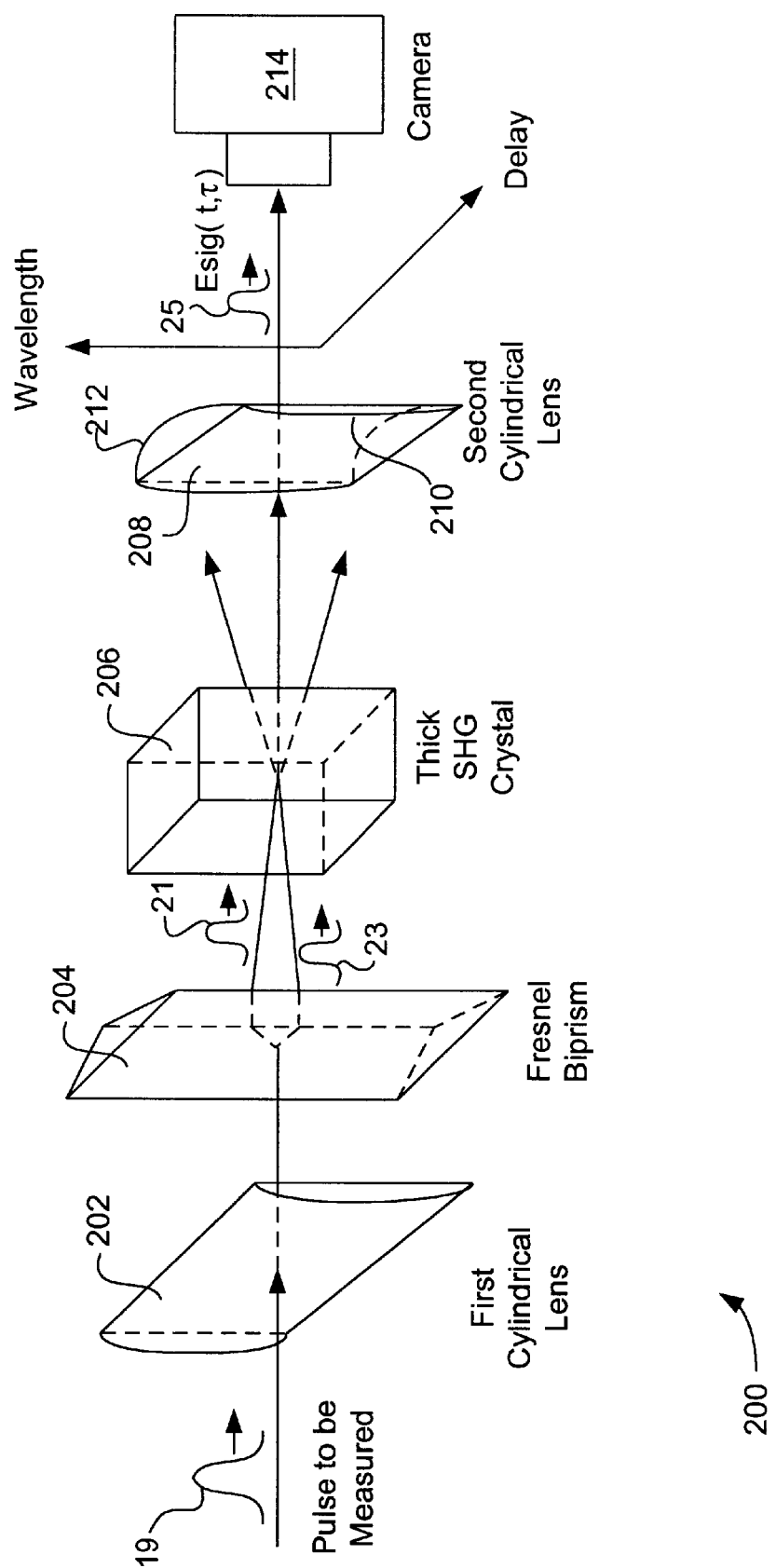
FIG. 2 is a schematic perspective illustration of the electromagnetic wave analyzer.

FIG. 2 shows a schematic perspective illustration of the electromagnetic wave analyzer 200. In FIG. 2, an ultrashort light input pulse 19 is introduced to a first cylindrical lens 202. The first cylindrical lens 202 produces an input pulse 19 line focus beam. The line focus beam passes through a Fresnel biprism 204. The Fresnel biprism 204 splits the line focus beam into a probe pulse 21 and a gate pulse 23. The Fresnel biprism 204 delays the gate pulse 23 in relation to the probe pulse 21 and passes the probe pulse 21 and the gate pulse 23 to a nonlinear optical medium, such as a thick SHG crystal 206. The thick SHG crystal 206 produces an input pulse 19 gated signal.

The first cylindrical lens 202 produces a line focus at the thick SHG crystal 206. The first cylindrical lens 202 also creates a high intensity beam for high SHG conversion efficiency. The first cylindrical lens 202 also produces a large beam divergence angle so that the beam divergence angle contains the thick SHG crystal 206 phase-matching angles for all wavelengths present in the input pulse 19. The beam divergence angle will also contain additional phase-matching angles for other wavelengths.

After the Fresnel biprism 204 splits the line focus beam and delays the gate pulse 23, the probe pulse 21 and the gate pulse 23 intersect at an angle in the thick SHG crystal 206 producing the gated signal. The intersection, and the resulting interaction of the probe pulse 21 and the gate pulse 23, causes delay to be mapped onto the horizontal position in the gated signal.

Figure 1:
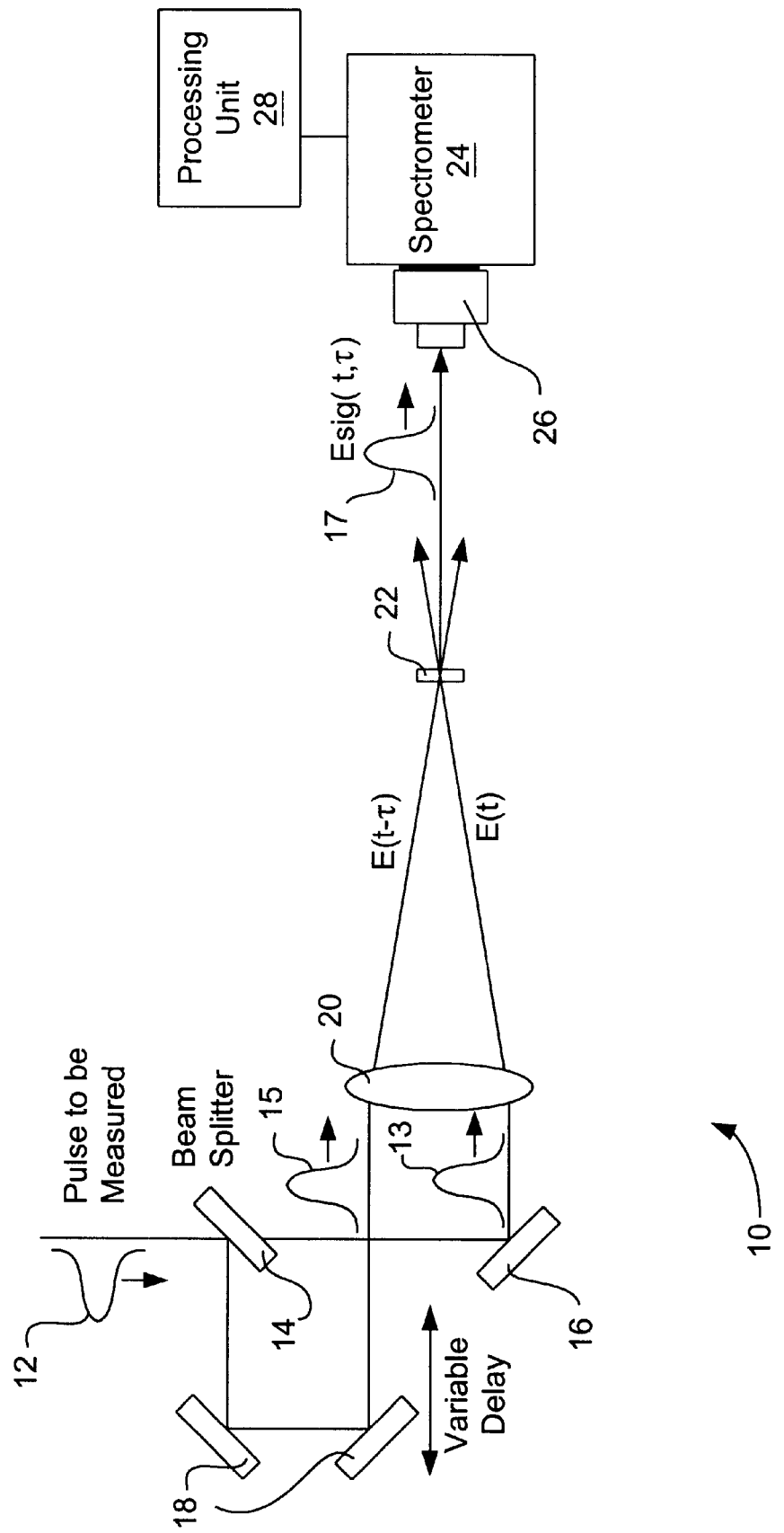
FIG. 1 is a schematic illustration of a prior art ultrashort full pulse measuring device.

Fresnel biprisms 204 are known to those having ordinary skill in the art. Fresnel biprisms include those prisms with close to a 180° apex angle. In the prior art, the splitting and delaying functions of the Fresnel biprism 204 were preformed by the beam splitter 14 and the delay line 18 (FIG. 1). The Fresnel biprism 204 may replace the beam splitter 14 and the delay line 18 in the prior art measuring device 10 (FIG. 1) to allow for general ultrafast spectroscopy with single-shot, delay-vs-position excite-probe measurements requiring minimal alignment.

The wavelength of the input pulse 19 that achieves phase-matching varies with the vertical thick SHG crystal 206 incidence angle. The high intensity line focus beam produced by the first cylindrical lens 202 creates a large beam divergence in the vertical direction at the thick SHG crystal 206. Therefore, all input pulse 19 wavelengths of interest phase-match for some incidence angle.

One of the problems with the thin SHG crystal 22 of the prior art measuring device 10 (FIG. 1) is the need to minimize group velocity mismatch (GVM). GVM is the difference between the reciprocals of the group velocities of an input beam and second harmonic wavelengths. GVM results in the walking off in time of the pulse and the second harmonic of the pulse due to different group velocities of the wavelength of the pulse and the wavelength of the second harmonic of the pulse. The effect of GVM can also be described as a crystal having a finite phase-matching bandwidth that only allows a small range of wavelengths to achieve efficient frequency doubling. As a result, a thicker SHG crystal acts as a wavelength filter with the beam incidence angle determining the center wavelength of the filter. The spectrometer 24 of the prior art measuring device 10 (FIG. 1) also acts as a wavelength filter. Thus, a thick SHG crystal 206 designed to frequency double only a limited range of wavelengths, performs the same function as the spectrometer 24 of the prior art measuring device 10.

The SHG crystal 206 should be designed to provide the appropriate range of wavelengths of the input pulse 19. The thick SHG crystal 206 should be thick enough so that the GVM between the wavelengths of the input pulse 19 and their second harmonics cause the thick SHG crystal 206 to act as a wavelength filter with enough resolution to resolve the details of the spectrum of the input pulse 19. However, the thick SHG crystal 206 should not be so thick that group velocity dispersion (GVD) causes the input pulse 19 to spread in time and distort. GVD is the difference between reciprocal group velocities of the wavelengths in the input pulse 19.

If the thick SHG crystal 206 is not infinitely thick, the phase-matching bandwidth will be finite. If the phase-matching is finite, it is possible the resulting resolution will be insufficient and some spectral structure will not be resolved. Therefore, it is preferable to prevent the input pulse 19 and its second harmonic from overlapping after propagating in the thick SHG crystal 206. This condition is satisfied where:

$$L\ GVM >> \tau_p \tag{1}$$

where "L" is the length of the thick SHG crystal 206, "$\tau_p$" is the length of the input pulse 19, and group velocity mismatch $(GVM) = 1/v_g(\lambda 2) - 1/v_g(\lambda)$, where "$v_g$" is the group velocity, and "$\lambda$" is the wavelength.

Group velocity dispersion will cause the input pulse 19 to undesirably spread in time. Group velocity dispersion is usually considerably smaller than the group velocity mismatch. The input pulse 19 will not spread to an undesirable degree if:

$$L\ GVD << \tau_c \tag{2}$$

where "$\tau_c$" is the smallest temporal spike in the input pulse 19 (i.e., the coherence time, or the reciprocal bandwidth, $1/\Delta\nu$, of the input pulse 19), and group velocity dispersion $GVD) = 1/v_g(\lambda - \delta\lambda/2) - 1/v_g(\lambda + \delta\lambda/2)$, where "$\delta\lambda$" is the bandwidth of the input pulse 19 in units of wavelength.

Combining equations (1) and (2) yields:

$$\tau_p / GVM << L << \tau_c / GVD \tag{3}$$

Therefore, a thick SHG crystal 206 length will satisfy both conditions if:

$$GVM/GVD >> TBP \tag{4}$$

where "TBP" is the input pulse 19 time-bandwidth product "$\tau_p/\tau_c$". For a Fourier transform limited pulse, (TBP~1), GVM>>GVD for all but near single cycle pulses.

For a near Fourier transform limited pulse, the thick SHG crystal 206 length should satisfy:

$$GVD << \tau_p / L << GVM \tag{5}$$

Group velocity dispersion is extremely small in the prior art analysis devices. Therefore, an increase in the magnitude of group velocity dispersion is acceptable to gain the benefits of the thicker SHG crystal 206.

Though beta barium borate (BBO) crystals work well as the thick SHG crystal 206, BBO is a relatively low dispersion crystal. Crystals with large dispersions are desirable in the electromagnetic wave analyzer 200 to avoid the need for a crystal that is too thick to satisfy the constraints noted above. Numerous higher dispersion crystals, such as lithium iodate, may be used to obtain an ideal crystal thickness of approximately 1–2 mm depending upon the electromagnetic wave to be measured.

In addition to other desirable properties, the thick SHG crystal 206 is easier to obtain than thin SHG crystals. The thick SHG crystal 206 also yields greater signal strength than thin SHG crystals.

The thick SHG crystal 206 angularly resolves the spectrum of the input pulse 19.

The thick SHG crystal 206 may be used with the prior art measuring device 10 beam-splitter 14 and delay line 18 (FIG. 1), without the Fresnel biprism 204. The thick SHG crystal 206 may also be used to increase the bandwidth in a standard autocorrelator or prior art FROG apparatus by angle-dithering the thick SHG crystal 206.

The input pulse 19 gated signal from the thick SHG crystal 206 is passed to a second cylindrical lens 208. The second cylindrical lens 208 produces a signal field pulse 25 based on the input pulse 19. The second cylindrical lens 208 has a first portion 210 that has horizontal power and a second section 212 that has vertical power. The first portion 210 of the second cylindrical lens 208 images the input pulse 19 gated signal onto a camera 214. The second portion 212 of the second cylindrical lens 208 Fourier transforms the gated signal of the input pulse 19 onto the camera 214. The first portion 210 and the second portion 212 of the second cylindrical lens 208 may also be separate lenses. "f" and "f/2" are convenient focal lengths for the first portion 210 and second portion 212, respectively, of the second cylindrical lens 208, where "f" is equal to the distance between the thick SHG crystal 206 and the second cylindrical lens 208 and "f" is also the distance between the second cylindrical lens 208 and the camera 214 (as shown in FIG. 3 and FIG. 4).

In the camera 214, delay is mapped onto the horizontal position and crystal vertical angle (and hence wavelength) is mapped onto the vertical position. The cylindrical lens 210 has a depth of field of approximately the thickness of the thick SHG crystal 206. The camera 214 produces a trace showing the signal pulse energy v. delay and wavelength. This measures the signal field pulse 25 from the thick SHG crystal 206 for the entire relevant range of delays and wavelengths of the input pulse 19 in a single shot. Camera 214 may be a camera chip or other detecting devices known to those having ordinary skill in the art.

The electromagnetic wave analyzer 200 is capable of measuring the full intensity and phase of a single ultrashort laser input pulse 19 and is also capable of taking a continuous measurement of a series of pulses. One way to take continuous measurements is to allow the camera 214 to integrate the trace over the series of pulses. The camera 214 then acquires all the necessary delays on each pulse.

Figure 3:
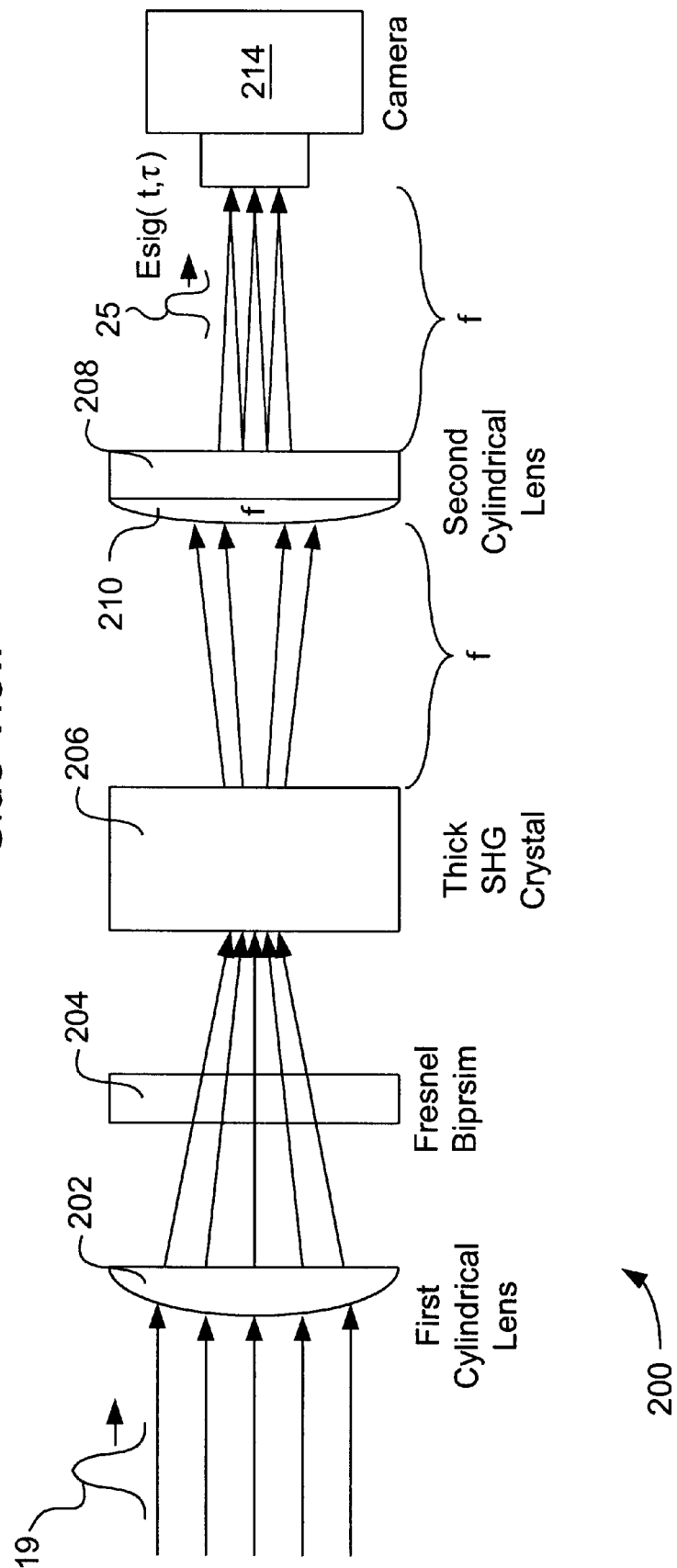
FIG. 3 is a schematic side-view illustration of the electromagnetic wave analyzer of FIG. 2.
Figure 4:
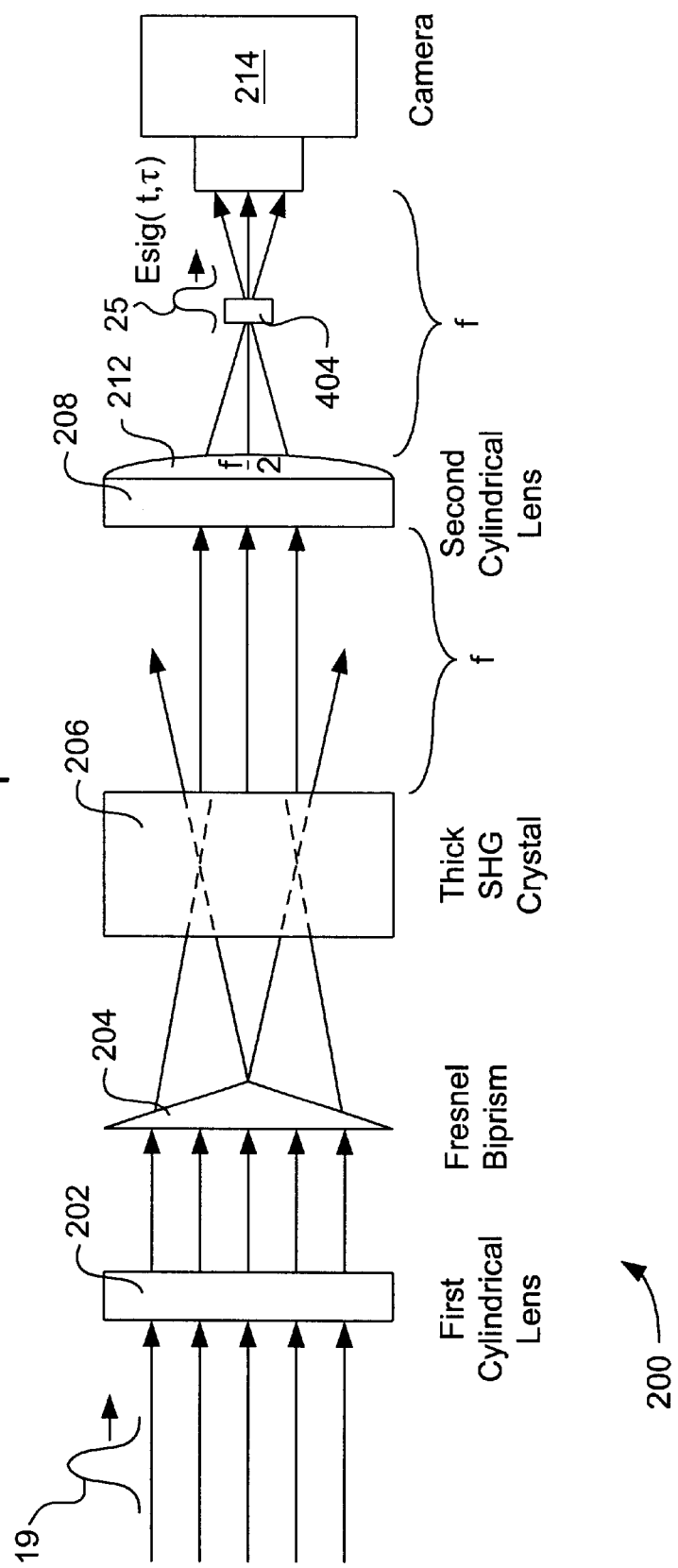
FIG. 4 is a schematic top-view illustration of the electromagnetic wave analyzer of FIG. 2.

FIG. 3 is a schematic side-view illustration of the electromagnetic wave analyzer 200 of FIG. 2. FIG. 3 shows the input pulse 19, the first cylindrical lens 202, the Fresnel biprism 204, the thick SHG crystal 206, the second cylindrical lens 208 and the camera 214 of the electromagnetic wave analyzer 200. In FIG. 3, the first portion 210 of the second cylindrical lens 208 is shown with a convenient focal length of "f".

FIG. 4 is a schematic top-view illustration of the electromagnetic wave analyzer 200 of FIG. 2. In FIG. 4, the second portion 212 of the second cylindrical lens 208 is shown with a convenient focal length of "f/2". In addition to the components shown in FIG. 3, FIG. 4 shows a slit filter 404 between the second cylindrical lens 208 and the camera 214 where the beam becomes a vertical line. Harmonic generation processes from the individual beams may occur in the thick SHG crystal 206 producing undesirable beams in other horizontal directions. The slit filter 404 filters out such extraneous beams and nonlinear optical effects in order to ensure a good signal-to-noise ratio. In some cases, a beam expander (not shown) may be required to expand the beam entering the electromagnetic wave analyzer 200.

For difficult pulse measurements, such as with complex pulses with large pulse time-bandwidth products, adjustments may be required. Such adjustments may include dithering the position of the ultrashort light input pulse 19 to increase the range of angles entering the thick SHG crystal 206 and therefore the wavelengths exiting from the thick SHG crystal 206 and eventually entering the camera 214. Also, to avoid the small amount of angular dispersion and group velocity dispersion introduced by the Fresnel biprism 204, a mirror having a kink in it can be used, so that only reflections are passed to the thick SHG crystal 206. Finally, it is noted that the electromagnetic wave analyzer 200 requires good spatial mode quality. However, this is generally the case with current ultrafast lasers. Spatial mode quality can also be taken into account by measuring the beam shape and normalizing by its squared energy vs. position. Though the electromagnetic wave analyzer 200 may encounter some pulse spreading and some spectral smearing, this may be accounted for by modifying the prior art iterative algorithms noted in the U.S. Pat. No. 5,530,544 issued to Trebino et al, which is entirely incorporated herein by reference. Those skilled in the art will recognize the modifications necessary to account for pulse spreading and spectral smearing.

It should be emphasized that the above-described embodiments of the present invention are merely possible examples of implementations, merely set forth for a clear understanding of the principles of the analyzer. Many variations and modifications may be made to the above-described embodiment(s) of the electromagnetic wave analyzer without departing substantially from the spirit and principles of the invention. All such modifications and variations are intended to be included herein within the scope of this disclosure and the present invention and protected by the following claims.

therefore, having thus described the invention, at least the following is claimed:

1. A system for analyzing an electromagnetic wave, the system comprising:
    a nonlinear optical medium,
        the nonlinear optical medium configured to accept a first wave and a second wave, the second wave being delayed in relation to the first wave,
        the nonlinear optical medium configured to have a group velocity mismatch (GVM) in relation to the electromagnetic wave,
        the nonlinear optical medium configured to have a group velocity dispersion (GVD) in relation to the electromagnetic wave,
        the nonlinear optical medium configured so that a pulse time-bandwidth product (TBP) satisfies the equation $GVM/GVD > TBP$, the nonlinear optical medium configured to phase-match a limited range of frequencies;
        the nonlinear optical medium configured to produce an output based on the phase-matching of the limited range of frequencies; and an output detector,
        the output detector configured to accept the output of the nonlinear optical medium;

the output detector configured to produce data, the data including the intensity and phase of the electromagnetic wave.

2. The system of claim 1, wherein the electromagnetic wave is an ultrashort laser pulse.

3. The system of claim 1, where the nonlinear optical medium is an SHG crystal.

4. The system of claim 1, where a Fresnel biprism produces the first wave and the second wave and the Fresnel biprism delays the second wave in relationship to the first wave.

5. The system of claim 1 where the second wave passes through a delay line.

6. The system of claim 1 where the nonlinear optical medium is configured to frequency double the limited range of frequencies and the nonlinear optical medium is configured to produce an output based on the frequency doubling of the limited range of frequencies.

7. The system of claim 1 where the output detector is a camera.

8. The system of claim 1 where the output detector maps delay in one direction and the output detector maps wavelength in a perpendicular direction.

9. The system of claim 1, where TBP satisfies the equation $$GVM/GVD \gg TBP.$$

10. A system for analyzing an electromagnetic wave, the system comprising:

a Fresnel biprism,
 the Fresnel biprism configured to produces a first wave and a second wave based,
 the Fresnel biprism configured to delay the second wave in relationship to the first wave, a nonlinear optical medium,
 the nonlinear optical medium configured to accept the first wave and the second wave,
 the nonlinear optical medium configured to phase-match a limited range of frequencies;
 the nonlinear optical medium configured to produce an output based on the phase-matching of the limited range of frequencies; and an output detector,
 the output detector configured to accept the output of the nonlinear optical medium;
 the output detector configured to produce data, the data including the intensity and phase of the electromagnetic wave.

11. The system of claim 10, where the electromagnetic wave is an ultrashort laser pulse.

12. The system of claim 10, where the nonlinear optical medium is an SHG crystal.

13. The system of claim 12, wherein
 the SHG crystal is configured to have a group velocity mismatch (GVM) in relation to the electromagnetic wave,
 the SHG crystal is configured to have a group velocity dispersion (GVD) in relation to the electromagnetic wave,
 the SHG crystal is configured so that the pulse time-bandwidth product (TBP) satisfies the equation $$GVM/GVD > TBP.$$

14. The system of claim 13, where TBP satisfies the equation $$GVM/GVD \gg TBP.$$

15. The system of claim 10, where the nonlinear optical medium is configured to frequency double the limited range of frequencies and the nonlinear optical medium is configured to produce an output based on the frequency doubling of the limited range of frequencies.

16. The system of claim 10, where the output detector is a camera.

17. The system of claim 10, where the output detector maps delay in one direction and the output detector maps wavelength in a perpendicular direction.

18. A method for analyzing an electromagnetic wave, the method comprising the steps of:

producing a first wave and a second wave;
delaying the second wave in relationship to the first wave;
introducing the first wave and the second wave to a nonlinear optical medium,
 the nonlinear optical medium configured to have a group velocity mismatch (GVM) in relation to the electromagnetic wave,
 the nonlinear optical medium configured to have a group velocity dispersion (GVD) in relation to the electromagnetic wave,
 the nonlinear optical medium configured so that the pulse time-bandwidth product (TBP) satisfies the equation $$GVM/GVD > TBP,$$

the nonlinear optical medium configured to phase-match a limited range of frequencies;
 the nonlinear optical medium configured to produce an output based on the phase-matching of the limited range of frequencies; and
introducing the output of the of the nonlinear optical medium to an output detector,
 the output detector configured to accept the output of the nonlinear optical medium;
 the output detector configured to produce data, the data including the intensity and phase of the electromagnetic wave.

19. The method of claim 18, where the electromagnetic wave is an ultrashort laser pulse.

20. The method of claim 18, where the nonlinear optical medium is an SHG crystal.

21. The method of claim 18, where a Fresnel biprism produces the first wave and the second wave and the Fresnel biprism delays the second wave in relationship to the first portion.

22. The system of claim 18, where the second wave passes through a delay line.

23. The system of claim 18, where the nonlinear optical medium is configured to frequency double the limited range of frequencies and the nonlinear optical medium is configured to produce an output based on the frequency doubling of the limited range of frequencies.

24. The system of claim 18, wherein the output detector is a camera.

25. The system of claim 18, where the output detector maps delay in one direction and the output detector maps wavelength in a perpendicular direction.

26. The system of claim 18, where TBP satisfies the equation $$GVM/GVD \gg TBP.$$

* * * * *

UNITED STATES PATENT AND TRADEMARK OFFICE
CERTIFICATE OF CORRECTION

PATENT NO. : 6,504,612 B2
DATED : January 7, 2003
INVENTOR(S) : Trebino

It is certified that error appears in the above-identified patent and that said Letters Patent is hereby corrected as shown below:

Column 6,
Line 28, please replace "($\lambda 2$)" with -- ($\lambda/2$) --.

Column 9,
Line 31, please replace "produces" with -- produce --.

Signed and Sealed this

Eighteenth Day of March, 2003

JAMES E. ROGAN
*Director of the United States Patent and Trademark Office*